F. B. CANNOCK.
VARIABLE SPEED TRANSMISSION GEARING.
APPLICATION FILED JULY 9, 1915.

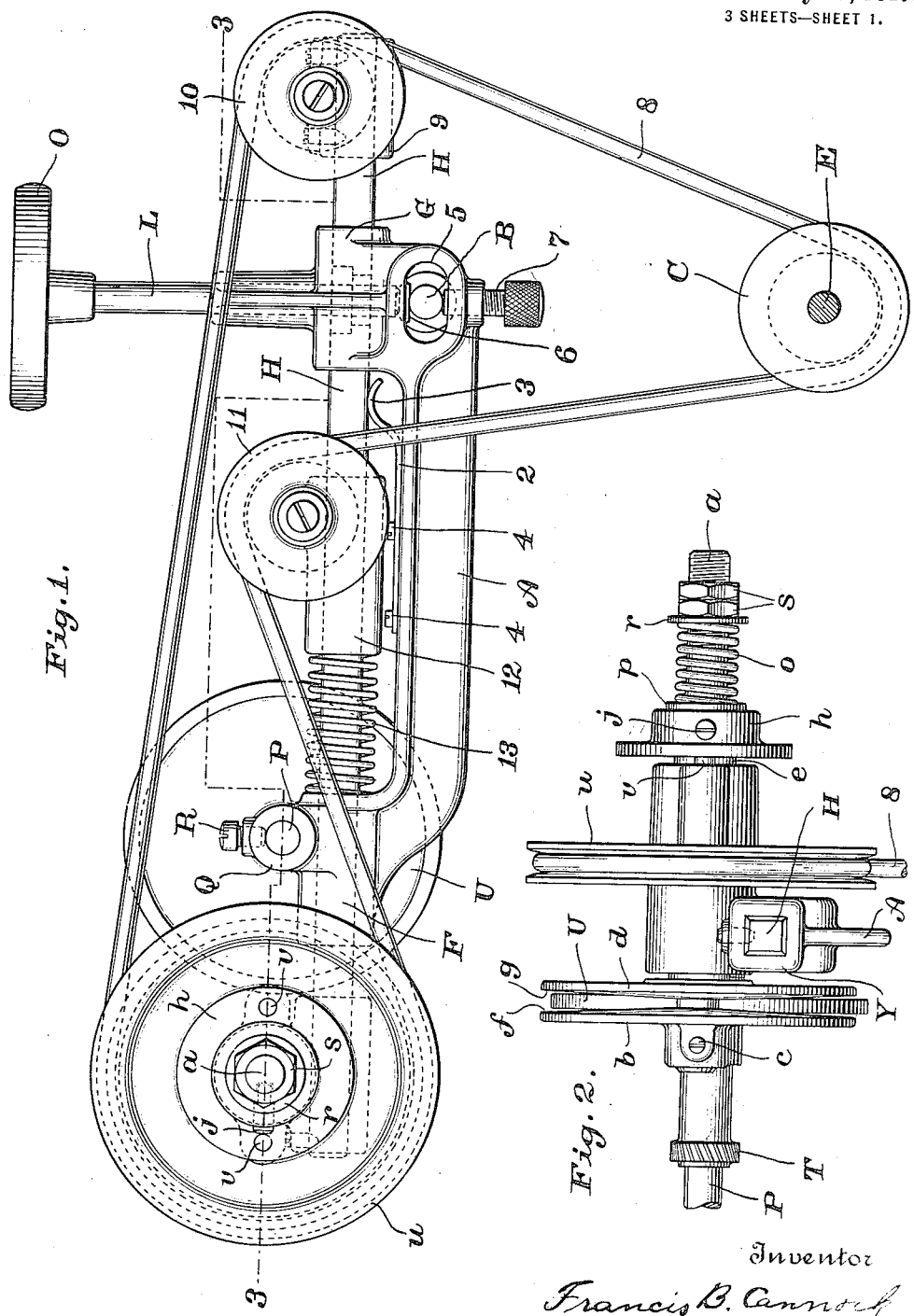

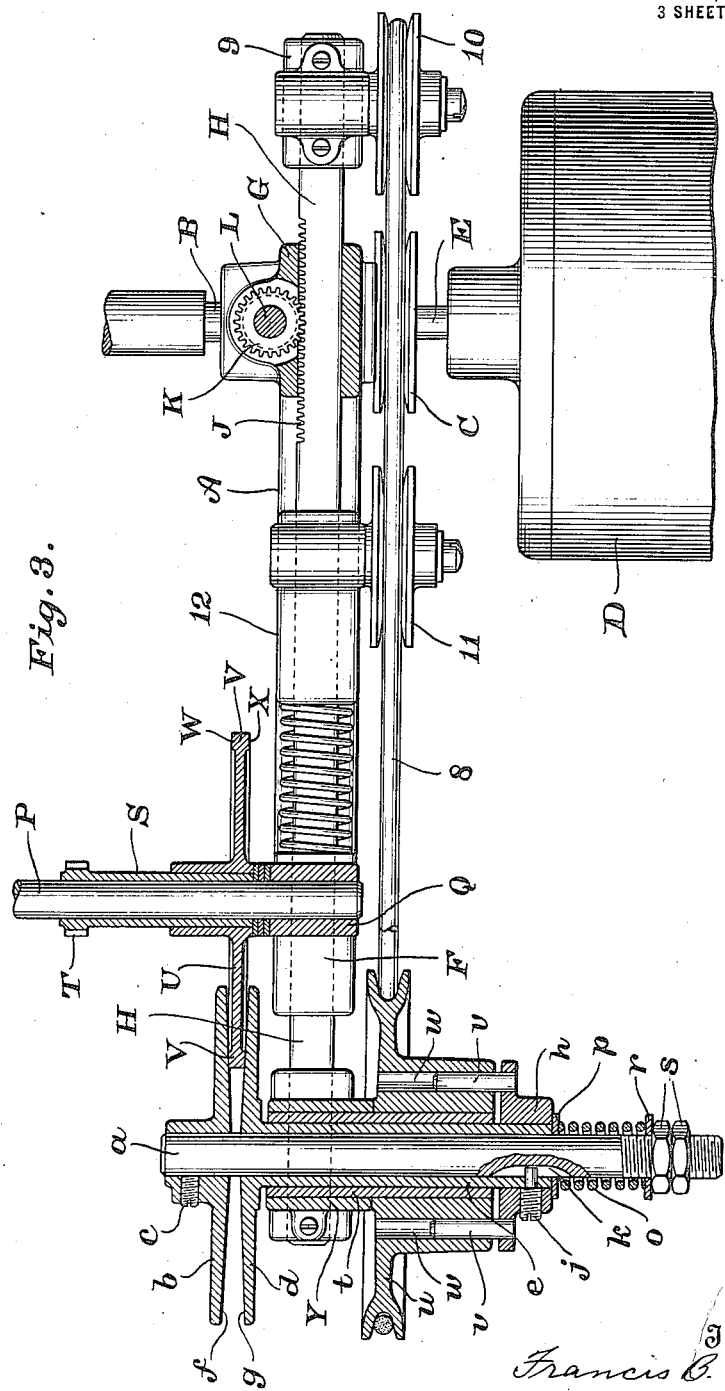

1,225,925.

Patented May 15, 1917.
3 SHEETS—SHEET 3.

Inventor
Francis B. Cannock
By his Attorneys
Sheffield & Betts

UNITED STATES PATENT OFFICE.

FRANCIS B. CANNOCK, OF NEW YORK, N. Y.

VARIABLE-SPEED-TRANSMISSION GEARING.

1,225,925.

Specification of Letters Patent.  Patented May 15, 1917.

Application filed July 9, 1915. Serial No. 38,847.

*To all whom it may concern:*

Be it known that I, FRANCIS B. CANNOCK, a citizen of the United States, and a resident of the borough of Manhattan, city, county, and State of New York, have invented certain new and useful Improvements in Variable-Speed-Transmission Gearing, of which the following is a specification accompanied by drawings.

This invention relates to gearing for transmitting motion from a prime mover to a driven member and particularly to transmission gearing provided with means for varying at will the speed of the driven member with relation to that of the prime mover.

One object of my invention is the provision of such a speed changing device, which shall be self-contained and portable and therefore may be readily adjusted to any machine to which it is desired to apply power.

Another object of my invention is to provide a device of this character whereby the speed of the driven member may be accurately varied through wide limits with a minimum of effort and inconvenience on the part of the operator.

Another object of my invention is to provide such a device, which shall be simple and inexpensive in construction and at the same time flexible and efficient in operation.

Another object of my invention is to so arrange the various elements of my transmission device that the losses, due to friction, may be reduced to a minimum.

Still another object of my invention is to provide a mechanism which shall serve, not only as a speed changing device, but also as a clutch for rendering any one of a plurality of machines operative at will.

Other objects of my invention will appear more fully hereinafter from the specification and claims which follow.

In the drawing, Figure 1 is a side elevation of an embodiment of my invention;

Fig. 2 is an end elevation thereof;

Fig. 3 is a top plan view partly in horizontal section upon the line 3—3 of Fig. 1.

Figure 4:
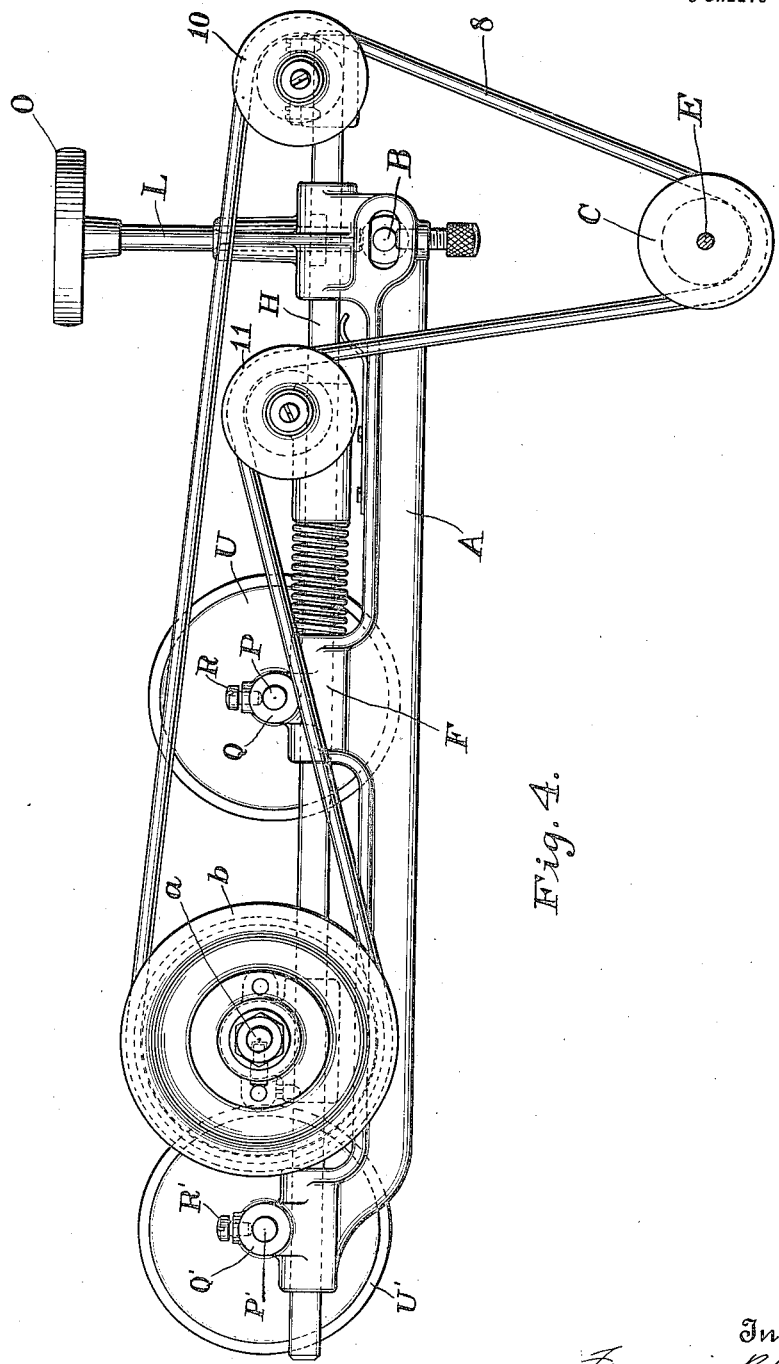
Fig. 4 is a side elevation of a device illustrating my invention as applied to a plurality of driven machines.

Referring to the drawings, A represents a suitable frame upon which the various parts of the device are mounted and B represents a stud, which may be a portion of the machine to which the transmission gear is to be applied. This transmission gearing is, of course, applicable to any type of machine in which it is desired to adjust the speed, but it is particularly applicable to motion picture projecting machines and for the purpose of an example, it will be assumed that the device herein described is applied to such a machine.

The driving pulley C is driven from any suitable prime mover, such for instance as an electric motor D provided with a shaft E upon which the pulley C is mounted.

Suitably mounted upon the frame A as by means of the bearings F and G and longitudinally movable therein, is a member H shown in this instance in the form of a bar, preferably rectangular in cross section, which may be provided with the rack J coöperating with the pinion K on the vertical shaft L. This shaft is preferably provided with some such means as the hand wheel O for rotating it to thereby adjust the member H longitudinally with respect to the frame A.

The stud P, which projects from the frame of the driven machine, assists in supporting the frame A which is provided with a boss Q adapted to be secured to the stud P in some suitable manner, as by a set screw R. Loosely mounted on this stud P is the sleeve S provided with a toothed member T adapted to mesh with the operative connections of the machine to be driven, for example, the projecting machine. The sleeve S carries also a friction disk U provided as shown in this instance with a rim V, the sides X—W of which are beveled in the form of truncated cones.

The longitudinal member or bar H is provided with the bearing Y for the rotary element which coöperates with disk U. As shown in the drawings, this rotary element includes a shaft *a* extending parallel to the driven member S and having secured thereto in some suitable manner, as by a set screw *c*, a friction disk *b*. A sleeve *e* is mounted upon this shaft *a* and is provided with a friction disk *d* adjacent the friction disk *b*. The friction disks *b* and *d* are preferably provided with conical sides *f* and *g*, which face toward each other. Mounted upon the sleeve *e* is the collar *h* provided with a set screw *j*, the end of which passes through the sleeve *e* and into a longitudinal recess $k$ in the shaft $a$, thereby preventing relative rotary movement, but permitting a certain amount of relative longitudinal movement between the shaft and sleeve.

I preferably provide means for pressing the disks $b$ and $d$ toward each other. It is obvious that if such means were arranged to react against the supporting bearings, considerable friction loss would occur as the result of the axial pressure against the bearings. In order to eliminate this loss, I have provided a novel arrangement, whereby the means for pressing the disks toward each other is entirely independent of the bearing and whereby the longitudinal movement of the rotary element as a whole within the bearing is unconstrained. This arrangement comprises essentially spring means such as the coiled spring $o$ interposed between the ends of the shaft $a$ and sleeve $e$ respectively. For this purpose I have shown a washer $p$ adjacent the end of the sleeve $e$ and a washer $r$ retained adjacent the end of the shaft $a$ by some suitable means, such as the nuts $s$. It is apparent that the tension of the spring may be adjusted by the manipulation of these nuts $s$.

A bearing sleeve $t$, as shown, may be placed over the sleeve $e$ and a pulley, preferably a grooved pulley such as shown at $u$, is mounted on the sleeve $t$. Pins $v$, carried by the collar $h$ extend into apertures $w$ in the hub of the pulley $u$, so that rotation of the pulley causes rotation of the sleeve $e$ and shaft $a$ and consequently of the disks $b$ and $d$.

From the above description, it is apparent that I have provided a construction in which the rotary element as a whole is unconstrained longitudinally and therefore capable of readily adapting itself to any irregularities in any of the coöperating elements and in which longitudinal movement between the component parts of this rotary element, that is, the shaft $a$ and disk $b$ on the one hand, and the sleeve $e$ and disk $d$ on the other hand, is permitted. It is also apparent that by the particular arrangement of the spring means, for forcing the disks $b$ and $d$ toward each other, I have eliminated all friction loss, due to the axial or thrust pressures of these parts.

As shown in the drawing, the disks $b$ and $d$ are adapted to embrace the disk U, whereby rotation of the disks $b$—$d$ effects rotation of the disk U and the member T. If the adjacent faces of the disks $b$—$d$ were plane surfaces, and if both sides of the disk U were plane surfaces, it is apparent that the surfaces of contact between the disks $b$—$d$ and the disk U would be of considerable extent, with the result that there would occur a large degree of slipping during the rotation of these parts, and a corresponding amount of friction loss. By making the adjacent faces of the disks $b$ and $d$ cone shaped and by correspondingly forming the rim V of the disk U, I have reduced the surfaces of contact to a mere line of contact, the length of said line depending upon the width of the rim V. As a result, there is a very slight amount of slipping between the rim V and the disks $b$ and $d$ and the friction loss resulting therefrom is practically negligible.

In order to vary the speed of the driven member T, I may, in any suitable manner, vary the distance between the axes of this member T and the rotary element, which includes the disks $b$ and $d$. In the embodiment herein shown, I accomplish this by moving the axis of the last-named element, such motion being effected by the movement of the bar H upon which the bearing Y is mounted. This adjustment of this bar H is effected through the rack J, pinion K and hand wheel O, or in any other suitable manner. By reason of the fact that I have provided spring means for forcing the disks $b$ and $d$ toward each other, it is apparent that these disks will always contact with the sides of the rim V irrespective of the adjustment of the bearing Y. In order to render the adjustment of the bearing Y as easy as possible, and to insure that it will remain in its adjusted position, I preferably make the inclination of the contacting cone surfaces of the disks equal to or less than the angle of repose of such surfaces, that is, I make the inclination such that the pressure of disks $b$, $d$, upon disk V will not separate the shafts $a$, P. I also preferably utilize a spring such as leaf spring 2 secured to the frame A by any suitable means such as set screws 4 and provided with a curved end 3 bearing against the movable member H to assist in retaining the parts in adjusted position.

The frame A is provided with means for affording provision for mounting the apparatus at any desired angle on the stud B or other mounting and in this instance the frame is provided with an elongated opening 5 and a seat 6, which may be slightly convex. A set screw 7 extends into the opening 5 and enables the frame to be tightly fastened to the stud at any desired angle or tipped transversely. Any suitable means may be provided for transmitting power from the prime mover D to the friction gearing and in this instance I show a flexible connector 8 with suitable idle pulleys therefor and a belt tightener, so arranged that the conductor 8 will at all times be retained tight, irrespective of the angular adjustment of the frame A about the stud B or the longitudinal adjustment of the member H. At one end of the movable member H is provided a mounting 9 provided with a bearing for the shaft of the movable idle pulley 10, and intermediate the driven pulley $u$ and the idle pulley 10 is provided another idle pulley 11, the bearing 12 for the shaft of which is in this instance slidably mounted upon the movable member or bar H. The connector 8 passes over the driving pulley C and over the idle pulleys 10 and 11 and over the driven pulley $u$ and a compression spring 13 abutting against the frame A and the bearing 12 of idle pulley 11 serves to maintain the belt tight. Obviously this construction is such that the belt or connector 8 is always maintained tight regardless of the angle at which the frame A is set and regardless of the longitudinal position of the movable member H.

In the operation of the transmission gearing, the frame A is mounted in the desired position upon or adjacent to the machine to be driven at variable speed, and the connector 8 having been adjusted, power may be applied from the source of power D. The speed of the driven member or sleeve S is varied by manipulating the hand wheel O and thereby varying the radial position of the rim V of the disk U with relation to the disks $b$ and $d$.

In Fig. 4 I have disclosed my invention as embodied in a device which is adapted to act as a clutch for driving any one of a plurality of rotary members and also as a means for varying at will the speed of the member so driven. The construction shown in this figure is substantially the same as that above described, except that I have modified the frame A somewhat in order to provide a second boss Q' similar to the boss Q and adapted to be connected to another stud, such as P' similar to the stud P, in some suitable manner, as by the set screw R'. It may be assumed, for example, that the stud P' extends from the frame of a second motion picture projecting machine and that the disk U' is mounted upon a sleeve which transmits motion to this second machine in a manner similar to that in which the sleeve S transmits motion to the first machine. With the parts as shown in this figure, the disks $b$ and $d$ comprising the rotary driving element, are in coöperative relation with the disk U' of the second machine, the first machine being idle. Obviously the speed of this second machine may be varied by adjusting the position of the bar H, as in the case of the device illustrated in Fig. 1.

It is apparent also that if the bar H is moved sufficiently to the right, as viewed in this figure, the rotary driven element may be caused to coöperate with the disk U of the first machine, whereby this machine will be driven by the transmission gearing, while the second machine remains idle. The speed of the first machine may then be varied by adjusting the bar H to vary the distance between the axes of the driving and driven members.

This adaptation of my invention is of particular importance in the art of motion picture projecting machines, since in projecting pictures it is customary to utilize two different machines, in order that the film may be changed in one, while the other is operating, and vice versa, thereby permitting of a substantially continuous exhibition.

It is to be understood that I do not wish to limit my invention to the hereindescribed embodiment or embodiments thereof, since obviously many changes may be made therein, without departing from the spirit of my invention.

What I claim is:

1. In a variable speed transmission gear, the combination of a supporting frame provided with a single bearing, a member rotatably and slidably mounted in said bearing and provided with a pair of disks, a parallel rotary member provided with a disk adapted to be received between the pair of disks and to contact therewith and means for varying the distance between said members to vary the speed of one of said members.

2. In a variable speed transmission gear, the combination of a supporting frame provided with a single bearing, a member rotatably and slidably mounted in said bearing and provided with a pair of conical disks having the conical sides thereof facing toward each other, a parallel rotary member provided with a disk having a conical rim adapted to be received between the pair of disks and to contact therewith, means for rotating the pair of disks and means for varying the radial position of said conical rim relatively to the conical disks to thereby vary the speed of one of said members.

3. In a variable speed transmission gear, the combination of a frame provided with a single bearing, a member rotatably and slidably mounted in said bearing and provided with a pair of conical disks having the conical sides facing toward each other, said disks being longitudinally separable but connected to rotate together, means for normally forcing said disks toward each other, a rotary driven member parallel to the first said member and provided with a disk having a rim beveled on both sides, said rim being adapted to lie between said pair of disks and contact with the conical sides thereof, means for rotating said pair of disks, and means for varying the distance between the axes of said rotary members to vary the speed of the driven member.

4. A variable speed transmission gear, comprising a rotary driven member carrying a friction disk, a frame, a longitudinally movable member carried by said frame, a single bearing carried by said movable member, a driving member rotatably and slidably mounted in said bearing in parallel relation to the driven member and provided with a pair of friction disks, means independent of said bearing for normally pressing said disks toward each other, the friction disk on the rotary driven member being adapted to enter between said pair of friction disks and contact therewith and means mounted on said frame for moving said longitudinally movable member to thereby vary the speed of the rotary driven member.

5. A variable speed transmission gear, comprising a rotary driven member carrying a friction disk, a frame, a longitudinal member carried by said frame, a single bearing carried by said movable member, a sleeve and shaft rotatably and slidably mounted in said bearing in parallel relation to the rotary driven member, said shaft being slidable in the sleeve but rotating therewith, friction disks carried by the shaft and sleeve respectively and means independent of said bearing for normally pressing said disks toward each other, the friction disk on the rotary member being adapted to enter between the two friction disks and contact therewith, and means mounted on said frame for adjusting the said longitudinally movable member, to thereby vary the speed of the rotary driven member.

6. A variable speed transmission gear comprising a frame, a longitudinally movable rack bar mounted on said frame, operative means for moving said rack bar, a single bearing carried by said rack bar, and movable therewith, a sleeve mounted transversely in said bearing, a shaft longitudinally movable within the sleeve, means for causing said shaft and sleeve to rotate together, conical disks carried by the shaft and sleeve respectively, the conical sides of said disks facing toward each other, spring means independent of said bearing for yieldingly forcing said disks together, a rotary driven member mounted transversely in the said frame parallel to the said shaft and sleeve, a disk carried by said rotary driven member and provided with a rim having conical sides adapted to make contact between the said conical disks, whereby the speed of the rotary driven member may be varied, by varying the radial position of said rim on said disks.

7. In a variable speed transmission gear, the combination of a supporting frame provided with a bearing, a member rotatably and slidably mounted in said bearing and provided on one side of said bearing with a pair of disks and on the other side of said bearing with a driving pulley and with means normally forcing the disks toward each other, a parallel rotary member provided with a disk adapted to be received between the pair of disks and to contact therewith, and means for varying the distance between said members to vary the speed of one of said members.

8. In a variable speed transmission gear, the combination of a supporting frame provided with a bearing, a member rotatably and slidably mounted in said bearing, and provided on one side of said bearing with a pair of conical disks having the conical sides thereof facing toward each other, and on the other side of said bearing with a driving pulley and with means normally forcing said disks toward each other, a parallel rotary member provided with a disk having a conical rim adapted to be received between the pair of disks and to contact therewith, means for rotating said driving pulley and means for varying the radial position of said conical rim relatively to the conical disks to thereby vary the speed of one of said members.

9. A variable speed transmission gear comprising a frame, a longitudinally movable member mounted on said frame, a rotary driven member mounted transversely on said frame, a friction disk carried by said rotary member, a parallel shaft mounted in said movable member and friction disks rotated thereby and coöperating with the disk on the rotary driven member, an idle pulley mounted at one end of the longitudinally movable member, a driving pulley connected to actuate the friction disks of the shaft mounted on the movable member, an intermediate idle pulley slidable on the movable member, a driving connector passing over said pulleys and means for actuating said connector.

10. A variable speed transmission gear, comprising a portable frame adapted to be mounted on a stud or other support, and means affording provision for changing the angle at which said frame is supported, a longitudinally movable member mounted on said frame, a rotary driven member mounted transversely in said frame, a friction disk carried thereby, a parallel shaft mounted on said movable member and friction disks rotated thereby and coöperating with the disk on the rotary driven member, an idle pulley mounted at one end of the longitudinally movable member, a driving pulley connected to actuate the friction disks of the shaft mounted on the longitudinally movable member, an intermediate idle pulley slidable on the said movable member, a driving connector passing over said pulleys and means for actuating said connector.

11. A variable speed transmission gear comprising a frame, a rotary driven member mounted in said frame, a longitudinally movable member also mounted in said frame, a driving member mounted in said longitudinally movable member and adapted to coöperate with said driven member in various relations to drive it at various speeds, depending upon the position of said longitudinally movable member, a driving pulley operatively connected to said driving member, an idler pulley mounted at one end of the longitudinally movable member, an intermediate idler pulley slidable on the movable member, a driving connector passing over said pulleys and means for actuating said connector.

12. In a variable speed transmission gear, the combination of a plurality of parallel rotary members, each provided with a disk, a power driven rotary member parallel to said first mentioned rotary members, and also provided with a disk, and means for adjusting said power driven member relative to said first mentioned members to cause the last mentioned disk to coöperate with any one of the first mentioned disks at any desired distance from the axis thereof, whereby any one of said first mentioned rotary members may be driven from the power driven member and the speed of the disk so driven may be varied at will.

13. In a variable speed transmission gear, the combination of a plurality of parallel rotary members, each provided with a disk having a conical rim, a power driven rotary member parallel to said first mentioned rotary members, and provided with a pair of conical disks having the conical sides facing toward each other, and means for adjusting said power driven member relatively to said first mentioned members to cause the last-named disks to embrace the conical rim of any one of the first named disks at any desired distance from the axis thereof, whereby any one of said first mentioned rotary members may be driven from said power driven member and the speed of the disk so driven may be varied at will.

14. A variable speed transmission gearing, comprising a plurality of parallel rotary members, each provided with a disk, a frame, a longitudinally movable member carried by said frame, a bearing carried by said movable member, a sleeve and shaft mounted in said bearing in parallel relation to the rotary members, said shaft being slidable in the sleeve, but rotating therewith, friction disks carried by the shaft and sleeve respectively, means for normally pressing said disks toward each other and means for adjusting said longitudinally movable member to cause said last mentioned disks to embrace any one of the first mentioned disks at any desired distance from the axis thereof to effect the driving of the corresponding member and to determine the speed of the member so driven.

In testimony whereof I have signed this specification in the presence of two subscribing witnesses.

FRANCIS B. CANNOCK.

Witnesses:
  W. W. HEALEY,
  M. E. EWING.